United States Patent
Hayashi et al.

(10) Patent No.: US 8,928,596 B2
(45) Date of Patent: Jan. 6, 2015

(54) DISPLAY PANEL AND DISPLAY DEVICE

(75) Inventors: Shuji Hayashi, Kanagawa (JP);
Tsutomu Tanaka, Kanagawa (JP);
Takeo Koito, Kanagawa (JP); Hiroshi Muzuhashi, Kanagawa (JP); Yuko Yamauchi, Kanagawa (JP)

(73) Assignee: Japan Display West Inc., Aichi-ken (JP)

( * ) Notice: Subject to any disclaimer, the term of this patent is extended or adjusted under 35 U.S.C. 154(b) by 449 days.

(21) Appl. No.: 12/571,634

(22) Filed: Oct. 1, 2009

(65) Prior Publication Data
US 2010/0079381 A1 Apr. 1, 2010

(30) Foreign Application Priority Data
Oct. 1, 2008 (JP) .................. 2008-256073

(51) Int. Cl.
*G06F 3/041* (2006.01)
*G06F 3/044* (2006.01)

(52) U.S. Cl.
CPC ...................... *G06F 3/044* (2013.01)
USPC ............. 345/173; 345/88; 345/104; 345/174; 345/201; 349/155; 349/156; 349/157; 349/160; 178/18.03; 178/18.05; 463/37

(58) Field of Classification Search
CPC .................... G09G 2330/021; G09G 2330/02; G09G 3/3696; G09G 3/3648; G09G 3/3688
USPC ........................ 345/173, 201, 88, 104, 174; 349/155–157, 160; 178/18.03, 18.05; 463/37
See application file for complete search history.

(56) References Cited

U.S. PATENT DOCUMENTS

| | | | |
|---|---|---|---|
| 6,073,036 A * | 6/2000 | Heikkinen et al. | 455/550.1 |
| 6,501,529 B1 | 12/2002 | Kurihara et al. | |
| 2006/0066590 A1 | 3/2006 | Ozawa et al. | |
| 2006/0109222 A1 * | 5/2006 | Lee et al. | 345/88 |
| 2008/0036932 A1 * | 2/2008 | Lee | 349/38 |

FOREIGN PATENT DOCUMENTS

| | | |
|---|---|---|
| CN | 1755603 A | 4/2006 |
| JP | 2001-075074 | 3/2001 |
| JP | 2002-287660 | 10/2002 |

(Continued)

OTHER PUBLICATIONS

Japanese Office Action for corresponding JP2008-256073 issued on Jul. 27, 2010.

(Continued)

*Primary Examiner* — Lun Yi Lao
*Assistant Examiner* — Shaheda Abdin
(74) *Attorney, Agent, or Firm* — K&L Gates LLP

(57) ABSTRACT

A display panel includes: a first substrate section formed on the front side of the display panel; a second substrate section which is opposed to the first substrate section; a plurality of pixel sections formed in a matrix form between the first and second substrate sections; and a plurality of sensor sections, each of the sensor sections having two electrodes, one electrode disposed with a electrode-to-electrode gap from the other between the first and second substrate sections, the electrode-to-electrode gap being removed as a result of the deformation of the first substrate section under pressure so that the one electrode is brought into contact with the other electrode, the sensor sections being provided between the first and second substrate sections with one of a plurality of electrode-to-electrode gap lengths respectively.

9 Claims, 17 Drawing Sheets

(56) References Cited

FOREIGN PATENT DOCUMENTS

| JP | 2005-275644 | 10/2005 |
|---|---|---|
| JP | 2006-127488 | 5/2006 |
| JP | 2007-052369 | 3/2007 |
| JP | 2008-116938 | 5/2008 |
| JP | 2008-146077 | 6/2008 |

OTHER PUBLICATIONS

Taiwanese Office Action issued Aug. 22, 2013 for corresponding Tawainese Appln. No. 098132935.

* cited by examiner

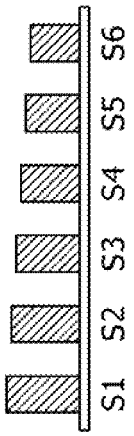

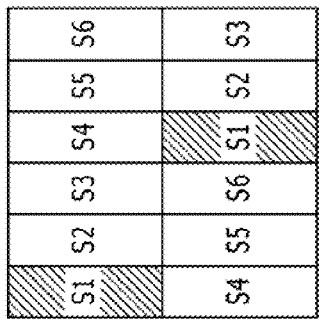
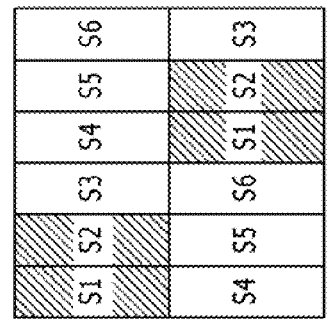
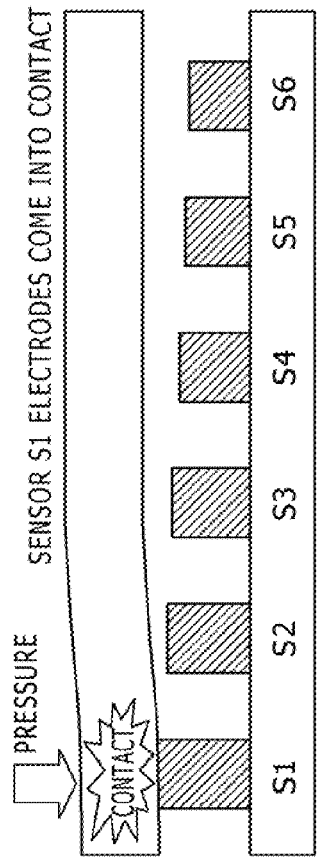
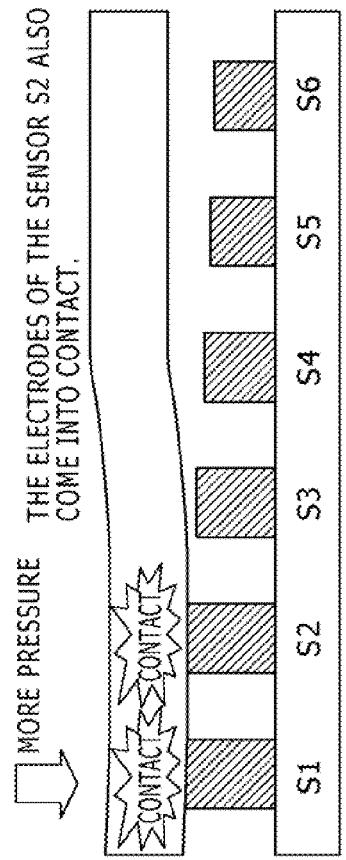
FIG. 15A
FIG. 15B

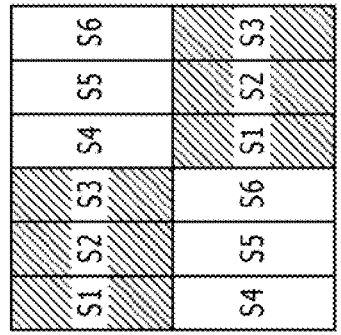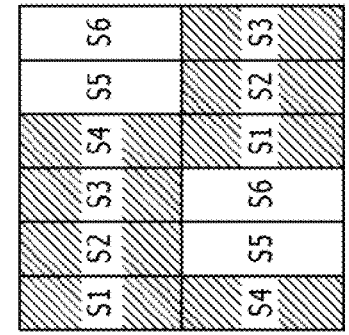
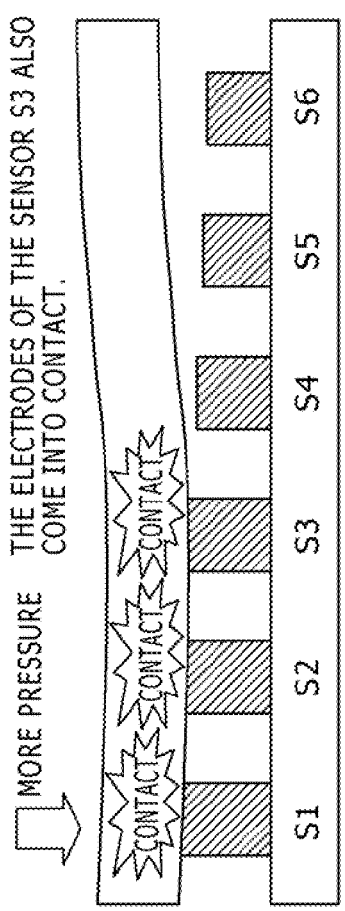
FIG.16A
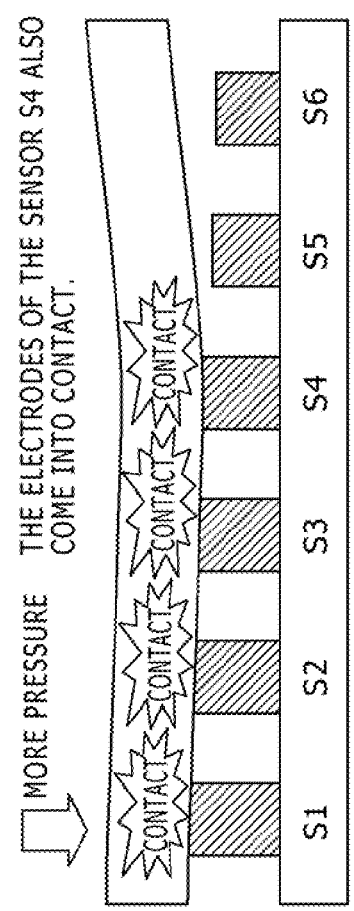
FIG.16B

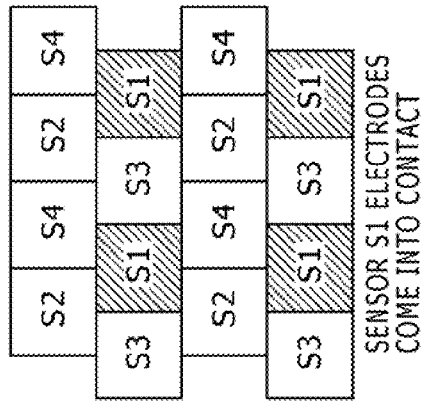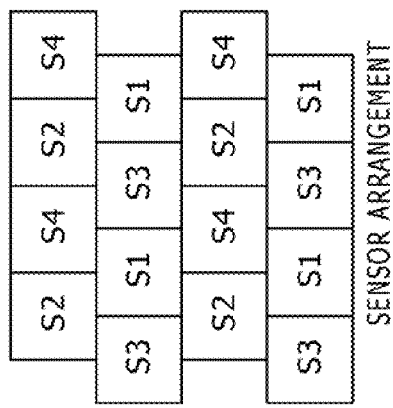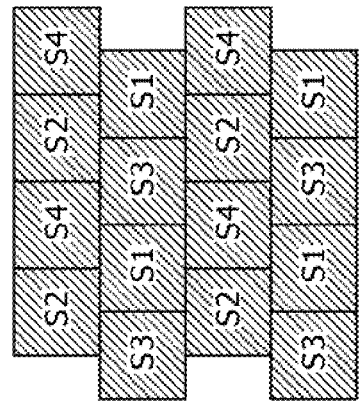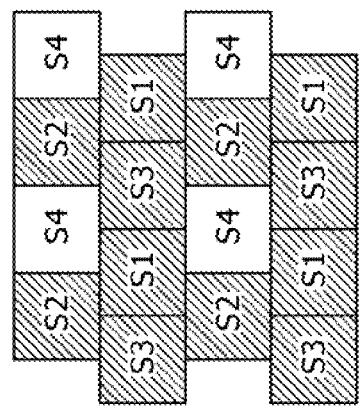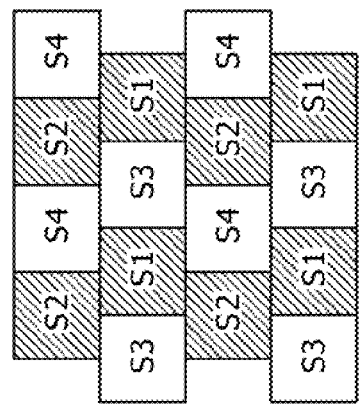

DISPLAY PANEL AND DISPLAY DEVICE

CROSS REFERENCES TO RELATED APPLICATIONS

The present application claims priority to Japanese Priority Patent Application JP 2008-256073 filed in the Japan Patent Office on Oct. 1, 2008, the entire content of which is hereby incorporated by reference.

BACKGROUND

The present application relates to a display panel such as liquid crystal display panel and a display device having the same.

Various types of displays have been proposed which have sensor capability and permit so-called touch-panel entries.

For example, Japanese Patent Laid-Open No. 2005-275644 proposes a method of detecting light reflected from a target in proximity using an optical sensor formed integrally with the panel.

Further, Japanese Patent Laid-Open No. 2001-75074 (hereinafter referred to as Patent Document 2) describes a method of detecting the pressed position of the panel as a result of direct contact between electrodes formed inside the panel when the panel is pressed.

Still further, Japanese Patent Laid-Open No. 2007-52369 (hereinafter referred to as Patent Document 3) proposes a method of forming gaps between electrodes based on height differences between different colors of the color filter.

SUMMARY

However, the existing display panels having sensor capability are designed to detect the position of the panel pressed by a finger or touch pen. A display panel designed to detect the pressing pressure in multiple levels has not yet to be proposed.

For example, in the direct contact type as in Patent Document 2 adapted to achieve position detection as a result of direct contact between the electrodes formed inside the panel when the panel is pressed, the pressing pressure can only be detected using a given threshold. This makes it impossible to permit entry of levels of gradation of the pressing pressure.

In the case of forming gaps between electrodes based on height differences between different colors of the color filter as in Patent Document 3, on the other hand, the height differences in the color filter are determined by optical specification such as chromaticity, contrast, transmittance and composition of the color filter material. This makes it impossible to achieve intended height differences.

Further, columns are provided to be shared by the color of the color filters with the largest cell thickness. As a result, only as many level differences as the number of colors other than the above color can be formed. This leads to only two levels of the pressing pressure resolution.

In light of the foregoing, it is desirable to provide a display panel which permits entry of multiple levels of gradation thanks to a new idea applied to the distance between electrodes, i.e., a display panel which can detect the pressing pressure in multiple levels. It is still desirable to provide a display device capable of determining the intensity of the pressure applied.

A display panel according to an embodiment includes a first substrate section formed on the front side of the display panel. The display panel further includes a second substrate section which is opposed to the first substrate section. The display panel still further includes a plurality of pixel sections formed in a matrix form between the first and second substrate sections. The display panel still further includes a plurality of sensor sections. Each of the sensor sections has two electrodes, one electrode disposed with a electrode to electrode gap from the other between the first and second substrate sections. The electrode-to-electrode gap is removed as a result of the deformation of the first substrate section under pressure, bringing the one electrode into contact with the other electrode. The sensor sections are provided between the first and second substrate sections with one of a plurality of electrode-to-electrode gap lengths respectively.

Further, the pixel sections are liquid crystal pixel sections.

Still further, the sensor sections are each formed for one of the liquid crystal pixel sections. A pixel electrode and common electrode adapted to drive the liquid crystal pixel section are used as the one and other electrodes.

The one electrode of the sensor section is formed on the first substrate, and the other electrode thereof is formed on the second substrate.

The plurality of sensor sections having different electrode-to-electrode gap lengths are arranged with predetermined regularity between the first and second substrates.

Further, the plurality of sensor sections form projecting portions of different heights on the second substrate. The other electrodes are arranged on the projecting portions, thus forming a plurality of electrode-to-electrode gap lengths.

Still further, the plurality of sensor sections form projecting portions of different heights on the first substrate. The one electrodes are arranged on the projecting portions, thus forming a plurality of electrode-to-electrode gap lengths.

Still further, the plurality of sensor sections form depressed portions of different depths on the second substrate. The other electrodes are arranged on the depressed portions, thus forming a plurality of electrode-to-electrode gap lengths.

Still further, the plurality of sensor sections form depressed portions of different depths on the first substrate. The one electrodes are arranged on the depressed portions, thus forming a plurality of electrode-to-electrode gap lengths.

Still further, the plurality of different electrode-to-electrode gap lengths are each set based on the relationship between a pressure applied to the first substrate section and deformation of the first substrate section.

A display device according to an embodiment includes, in addition to the constituent components of the display panel, a display drive section and sensor read section. The display drive section drives the plurality of pixel sections to display an image. The sensor read section determines the position of the first substrate section to which a pressure is applied and the amount of pressure applied thereto by detecting each electrode contact condition at a plurality of sensor sections.

That is, in an embodiment, each of the sensor sections is set to one of the electrode-to-electrode gap lengths. As a result, the sensor sections having a plurality of electrode-to-electrode gap lengths are arranged between the first and second substrates. For example, a sensor section is formed for each pixel.

In this case, when a given pressing pressure is applied to a planar position of the front side of the first substrate section, the several sensor sections provided near the planar position have their electrodes in different contact conditions according to the electrode-to-electrode gap length. That is, the electrodes of the sensor section with a short electrode-to-electrode gap length come into contact with each other even when a small pressing pressure is applied. On the other hand, the electrodes of the sensor section with a long electrode-toelectrode gap length do not come into contact with each other until a large pressing pressure is applied.

Therefore, if the sensor sections having a large number of electrode-to-electrode gap lengths are arranged, the different sensor sections respond to the pressing pressure (that is, the electrodes of the different sensor sections come into contact with each other). Therefore, not only the pressed position but also the level of gradation of the pressing pressure can be detected by detecting the sensor section which has responded.

An embodiment is effective in that it permits ready entry of levels of gradation adapted to distinguish between different pressing pressures, unlike existing contact input which can only distinguish between two different states or presence or absence of contact.

Such entry of levels of gradation contributes to increased variety in the use of touch panel entry and enhanced functionality, including making it possible to provide, for example, an application program which reads the change in writing pressure and draws brush-drawn-looking characters and images, despite the fact that they are pen-drawn.

Additional features and advantages are described herein, and will be apparent from the following Detailed Description and the figures.

BRIEF DESCRIPTION OF THE FIGURES

FIGS. 14A to 14H are explanatory diagrams of an example of arrangement of the sensors according to the embodiment;

FIGS. 15A and 15B are explanatory diagrams of the sensors in a contact condition according to the embodiment;

FIGS. 16A and 16B are explanatory diagrams of the sensors whose electrodes are in contact according to the embodiment; and FIGS. 17A to 17E are explanatory diagrams of arrangement of the sensors according to the embodiment.

DETAILED DESCRIPTION

Figure 1:
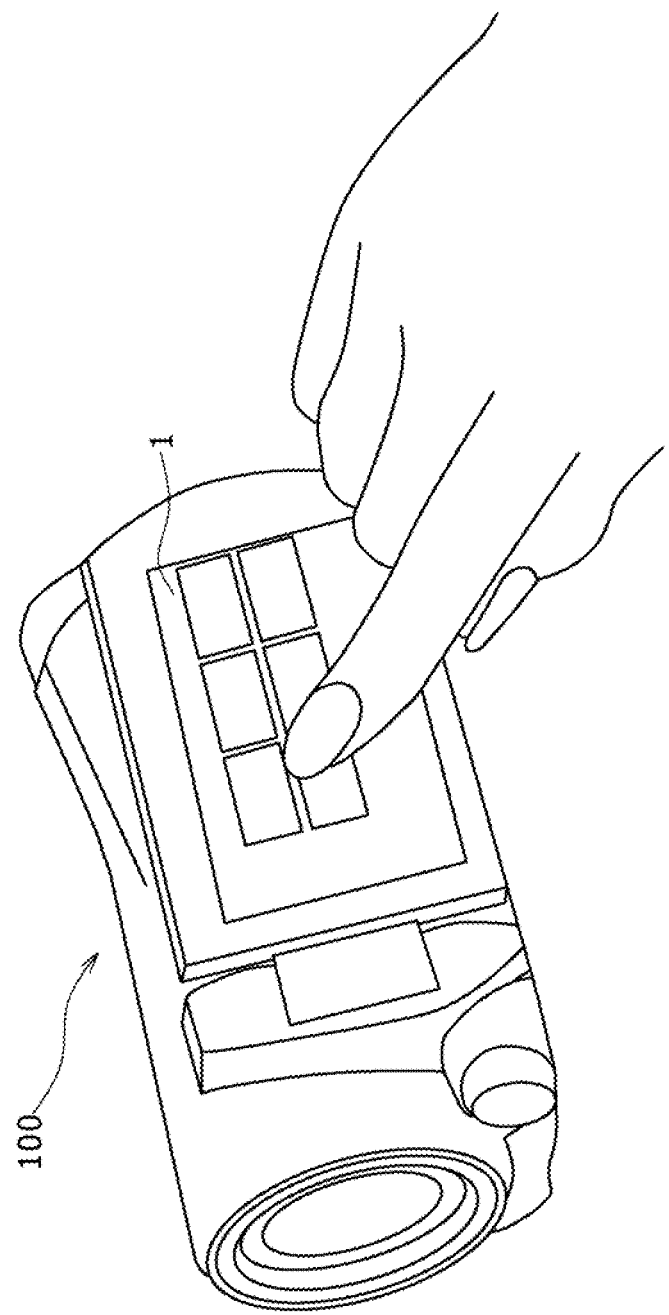
FIG. 1 is an explanatory diagram of a video recording device incorporating a liquid crystal display device according to an embodiment.

A description will be given below of a liquid crystal display panel and liquid crystal display device according to an embodiment of the present application in the following order:
1. Liquid Crystal Panel Structure
2. Sensor Structure
3. Examples of Sensor Structures with Different Electrode-to-Electrode Gap Lengths
4. Examples of Setting Electrode-to-Electrode Gap Lengths
5. Examples of Arrangement of the Sensors
6. Effects of the Embodiment and Modification Example 1. Liquid Crystal Panel Structure FIG. 1 illustrates an example of a video recording device (camcorder) 100 incorporating the liquid crystal display device (liquid crystal display panel) according to the present embodiment.

The video recording device 100 has a liquid crystal display panel 1. The liquid crystal display panel 1 displays a monitor image during moving image recording and a reproduced image during moving image reproduction. The liquid crystal display panel 1 also displays, for example, an operation menu; icons and thumbnail images. The same panel 1 permits touch panel operation, accepting operation input made by the user as he or she touches an operation menu item or icon with a finger.

Figure 2:
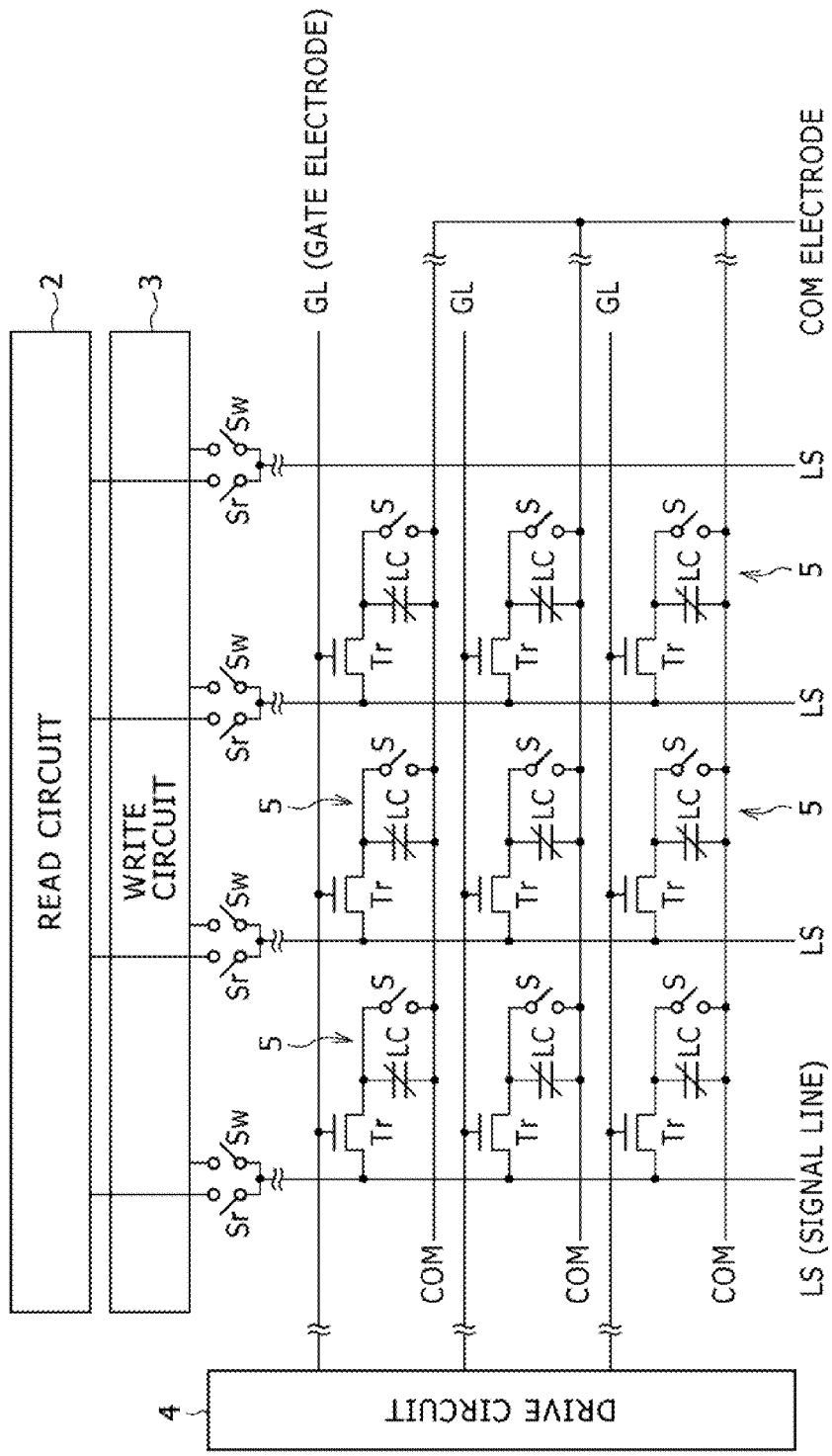
FIG. 2 is an explanatory diagram of the configuration of the liquid crystal display device according to the embodiment.
Figure 3:
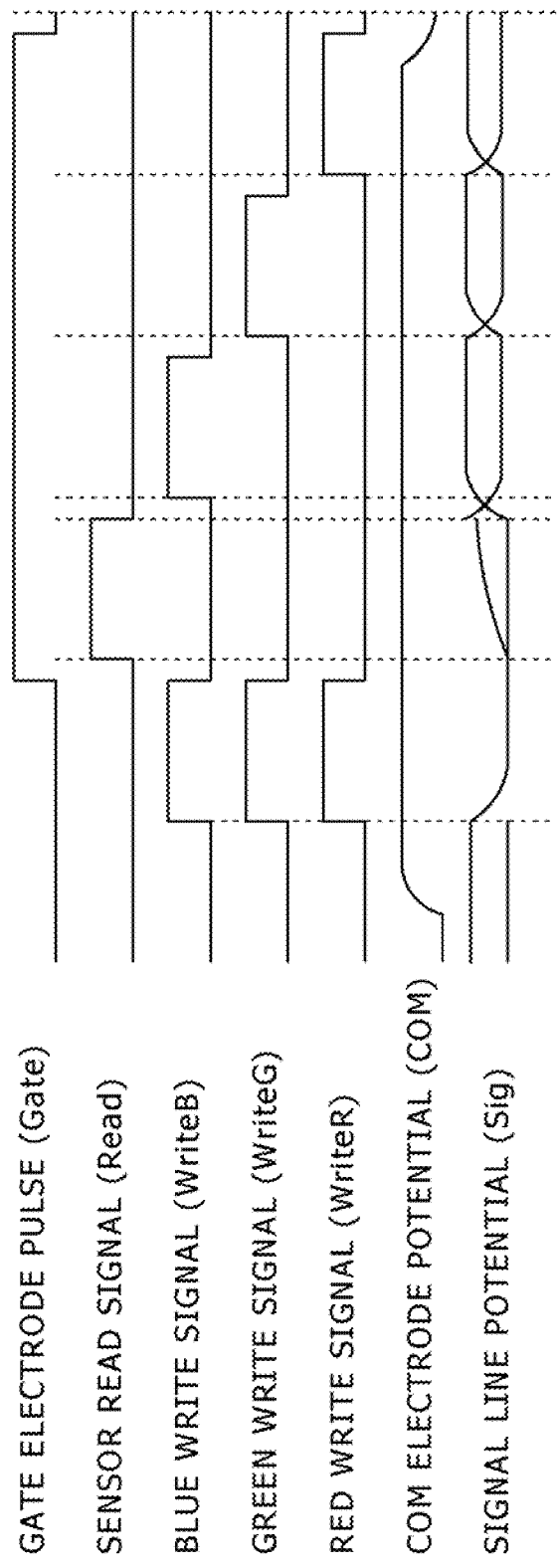
FIG. 3 is a waveform diagram describing the operation timings of the liquid crystal display device according to the embodiment.

FIG. 2 illustrates a configuration example of a liquid crystal display device having the liquid crystal display panel 1. FIG. 3 illustrates a timing diagram illustrating the operation of the liquid crystal display device.

The liquid crystal display device includes a pixel array. The pixel array includes a read circuit 2, write circuit 3, drive circuit 4 and pixel circuits 5 arranged therein.

The drive circuit 4 supplies a drive pulse to gate lines (gate electrodes) GL in sequence every horizontal period. The gate lines GL are disposed one for each of the horizontal lines of the pixel array.

The write circuit 3 outputs a signal level to signal lines LS disposed as vertical lines of the pixel array in synchronism with the driving of each of the horizontal lines by the drive circuit 4. The signal level is based on display data supplied from a display video signal processing circuit which is not shown. When the signal level is output, a write switch Sw is switched ON, connecting the write circuit 3 to each of the signal lines LS.

The read circuit 2 reads ON/OFF information of a sensor S formed in each of the pixel circuits 5 in synchronism with the driving of each of the horizontal lines by the drive circuit 4. When the information of the sensor S is read, a read switch Sr is switched ON, connecting the read circuit 2 to each of the signal lines LS. The output of the sensor S is converted to digital data by the read circuit 2. At the same time, the pressed horizontal position (display panel position) and the amount of pressing pressure are determined based on the detection results of the ON/OFF information for one screen.

The pixel circuits 5 each include a liquid crystal cell LC. The liquid crystal cell LC includes liquid crystal sealed between electrodes (pixel electrode and common electrode (COM electrode)) opposed to each other.

Further, the pixel circuits 5 each include a pixel transistor Tr. The pixel transistor Tr has its gate node connected to the gate line GL, its source node connected to the signal line LS and its drain node connected to the pixel electrode of the liquid crystal cell LC.

Still further, the pixel circuits 5 each include the sensor S. The pixel and COM electrodes come into electrical contact with each other when an external pressure such as pressing pressure by a finger is exerted on the sensor S.

The operation of the liquid crystal display device will be described below with reference to FIG. 3.

FIG. 3 illustrates a gate electrode pulse (Gate) supplied to the given gate line GL by the drive circuit 4, a sensor read signal (Read) adapted to control the read switch Sr ON and OFF, and write signals (WriteB (blue), WriteG (green) and WriteR (red)) adapted to control the write Sw ON and OFF. FIG. 3 also illustrates the potentials of the COM electrode and signal line LS. The sensor read signal (Read) and write signals (WriteB, WriteG and WriteR) are generated respectively by unshown control circuit sections at predetermined timings during a horizontal period so as to switch ON the read switch Sr and write switch Sw.

As the basic drive timing, the COM electrode is inverted in polarity first. In FIG. 3, a case is shown in which the COM electrode changes from L (low) to H (high) level.

Next, all the write signals (WriteB, WriteG and WriteR) change to H level, switching ON all the write switches Sw. At this time, all the signal lines LS are precharged to the level opposite in phase to that of the COM electrode.

Then, the write signals (WriteB, WriteG and WriteR) change to L level, switching OFF all the write switches Sw.

Next, the drive circuit 4 pulls the gate electrode pulse (Gate) up to H level, turning ON the pixel transistors Tr of the horizontal pixel circuits 5 which are connected to the gate line GL. This connects the pixel electrodes and signal lines LS together.

Next, the sensor read signal (Read) is pulled up to H level, switching ON all the read switches. At this time, the information of the sensors S of the pixel circuits 5 along a given horizontal line whose pixel transistors Tr are currently ON by the gate electrode pulse (Gate) is fed to the read circuit 2.

For example, in the case of the sensor S of the pixel circuit 5 in the area which has not received any input (pressure) from outside the panel, the COM and pixel electrodes are electrically separated from each other (the sensor is OFF). As a result, the input from this sensor S to the read circuit 2, i.e., the potential of the signal line LS, remains unchanged from the precharged level.

In the case of the sensor S of the pixel circuit 5 in the area which has received an input (pressure) from outside the panel, on the other hand, the COM and pixel electrodes are electrically connected together (the sensor is ON). As a result, the input from this sensor S to the read circuit 2, i.e., the level of the signal line LS, increases from the precharged level to the level of the COM electrode.

The read circuit 2 detects this change in signal line level as a result of the COM and pixel electrodes being brought into or remaining out of contact with each other by converting the change into "1" or "0" digital signal during a read period (period during which the sensor read signal (Read) is at H level).

The read circuit 2 reads the sensor information from the pixel circuits 5 line by line every horizontal period as described above. This allows for the information of the sensors S of all the pixel circuits 5 to be read in one frame period.

Then, the read circuit 2 determines the touched position of the screen and amount of touching pressure (level of gradation of the pressure applied) based on the read information. The pressing pressure can be determined because the sensors S are formed with different electrode-to-electrode gap lengths as described later.

When the read period of the sensor S information ends, the sensor read signal (Read) is pulled down to L level, followed by the writing of the signal level to the pixel circuits 5.

That is, the write signals (WriteB, WriteG and WriteR) change to H level in sequence. Each time the write switches Sw are switched ON, the write circuit 3 writes video signal levels respectively to the blue, green and red pixels.

2. Sensor Structure

A description will be given below of the structure of the sensor S formed in the pixel circuit 5 in the liquid crystal display device which is configured and operates as described above.

Here, the basic structure thereof will be described with reference to FIGS. 4 and 5.

Figure 4:
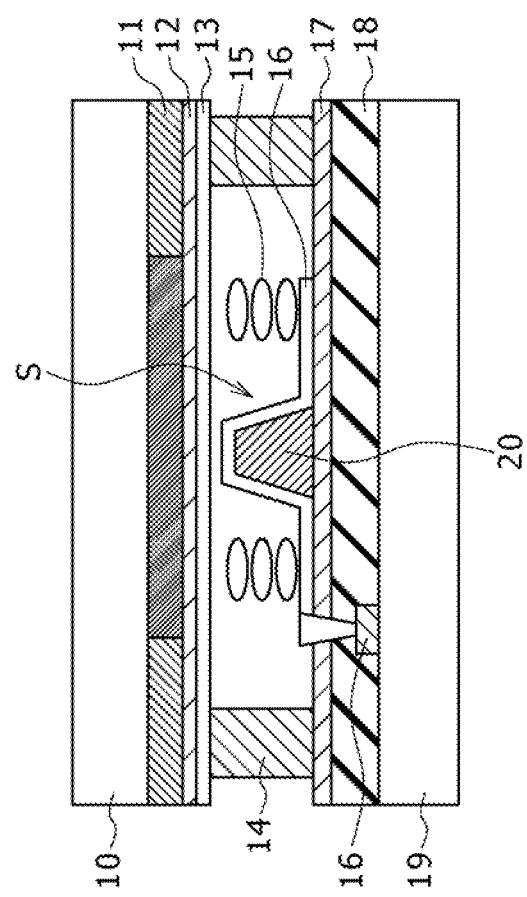
FIG. 4 is an explanatory diagram of a basic sensor structure according to the embodiment.

FIG. 4 schematically illustrates the cross-sectional structure of a pixel of the liquid crystal display panel 1.

A color-filter-side glass substrate 10 serves as a substrate on the front side of the panel. A TFT (thin film transistor)-side glass substrate 19 is disposed to be opposed to the color-filter-side glass substrate 10. A liquid crystal pixel structure is formed between the two glass substrates 11 and 19.

In the present example, as illustrated in FIG. 4, a color filter 11 made of an organic film and an overcoating material 12 are formed on the color-filter-side glass substrate 10, and an opposed contact electrode 13 serving as one of electrodes making up the sensor S is formed on the overcoating material 12. The COM electrode shown in FIG. 2 is used as the opposed contact electrode 13. That is, as is clear from the pixel circuits 5 shown in FIG. 2, the sensors S share the COM electrode as a sensor switch electrode.

On the other hand, a pixel electrode 16 adapted to apply an electric field to the liquid crystal is formed on the TFT-side glass substrate 19 via an insulating film 18 and planarizing film 17.

The pixel electrode 16 is the drain node electrode of the pixel transistor Tr shown in FIG. 2. The pixel electrode 16 is disposed to be opposed to the opposed contact electrode 13 (COM electrode). Liquid crystal 15 is sealed between the two electrodes, thus forming the liquid crystal cell LC.

Here, the pixel electrode 16 and opposed contact electrode 13 (COM electrode) are opposed to each other so as to be separated by a predetermined distance by a spacer 14 adapted to form a liquid crystal gap.

In this condition, a hollow sensor column (hereinafter referred to as the sensor column) 20 is formed on the planarizing film 17. The pixel electrode 16 is continuous on the sensor column 20.

In the pixel electrode 16, the top portion of the sensor column 20 and the opposed contact electrode 13 (COM electrode) which is opposed to the top portion form the switch structure of the sensor S.

Figure 5:
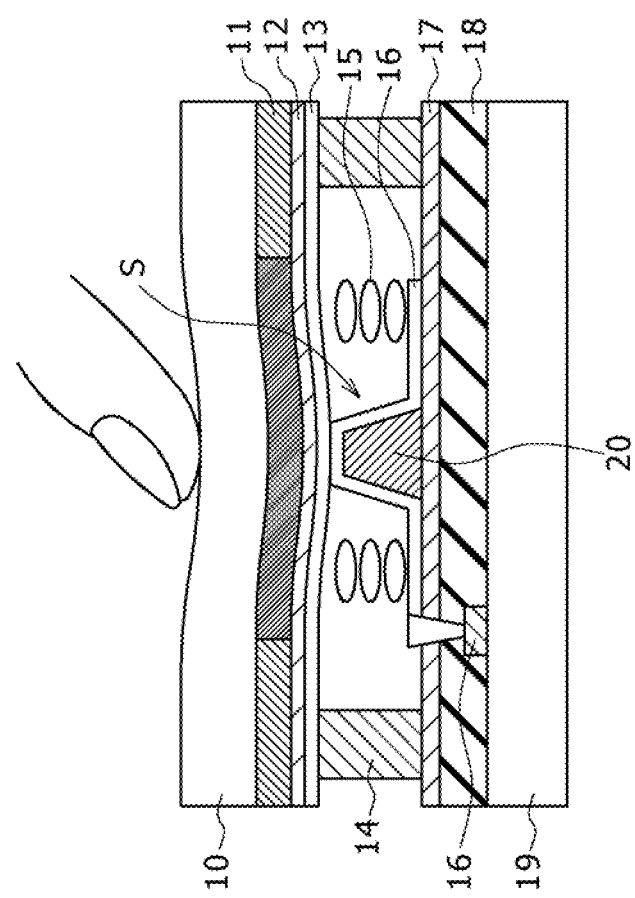
FIG. 5 is an explanatory diagram of the sensor according to the embodiment when the sensor is pressed.

FIG. 5 illustrates an object such as a finger or stylus touching the surface of the color-filter-side glass substrate 10. As the pressing pressure deforms part of the color-filter-side glass substrate 10, the pixel electrode 16 formed on the top portion of the sensor column 20 comes into contact with the opposed contact electrode 13. In the pixel not pressed with a finger or other object, on the other hand, the pixel electrode 16 and opposed contact electrode 13 remain separated from each other as illustrated in FIG. 4.

When the pixel electrode 16 and opposed contact electrode 13 come into contact with each other as a result of the pressing as illustrated in FIG. 5, the potential of the signal line LS connected to the pixel circuit 5 in question changes from the precharge level to the level of the COM electrode. In the condition shown in FIG. 4, on the other hand, the potential of the signal line LS connected to the pixel circuit 5 remains at the precharge level.

During the read period (period during which the sensor read signal (Read) is at H level) described earlier with reference to FIG. 3, the read circuit 2 determines whether the sensor S of the pixel circuit 5 in question is ON or OFF by determining the potential of the signal line LS.

3. Examples of Sensor Structures with Different Electrode-to-Electrode Gap Lengths If the sensor S configured as described above is provided in each of the pixel circuits 5, the read circuit 2 can detect which position of the screen has been pressed by determining whether each of the sensors S is ON or OFF during a frame period. That is, it is only necessary to determine the pixel position whose sensor S is ON.

However, the present embodiment determines not only the touched position but also the amount of touching pressure in multiple levels. That is, the present embodiment determines the level of gradation of pressing pressure.

Therefore, the sensors S of the pixel circuits 5 are each arranged between the color-filter-side glass substrate 10 and TFT-side glass substrate 19 with their electrodes set to one of a plurality of gap lengths (distances between the pixel electrode 16 and opposed contact electrode 13).

A description will be given below of various examples of the structure with reference to FIGS. 6 to 12.

Figure 6:
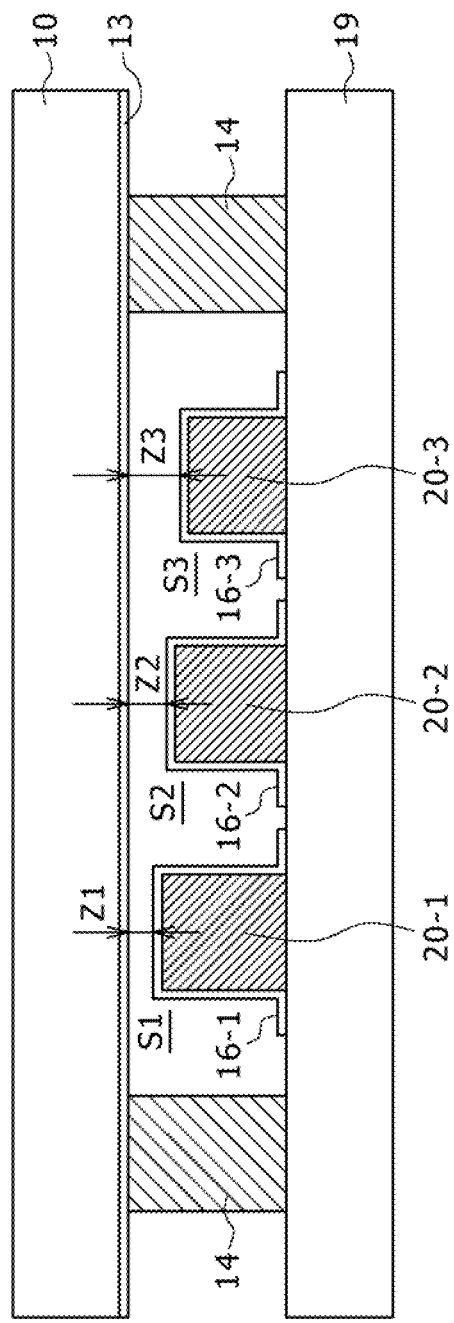
FIG. 6 is an explanatory diagram of an example of sensor structure with different electrode-to-electrode gap lengths according to the embodiment.

FIG. 6 illustrates an example in which the sensors S have different electrode-to-electrode gap lengths in the basic configuration shown in FIG. 4.

It should be noted that the spacers 14 are not formed between every pair of pixels. Instead, in reality, the spacer 14 is provided every predetermined pixel block (n by m pixels). In FIGS. 6 to 12 described below, examples are shown in which three pixels are provided horizontally or vertically between a pair of the spacers 14 for reasons of illustration. In reality, however, the spacers 14 are likely disposed in a further discrete manner in the plane direction.

Further, FIGS. 6 to 12 will be described assuming, for reasons of simplicity in description and illustration, that each pixel is set to one of three different electrode-to-electrode gap lengths.

It should be noted that, in FIGS. 6 to 12, the color filter 11 and overcoating material 12 are not shown on the color-filter-side glass substrate 10. Further, the insulating film 18 and planarizing film 17 are not shown on the TFT-side glass substrate 19.

For example, in the example shown in FIG. 6, the sensor columns 20 of the pixels differ in height from one another. That is, a relatively high sensor column 20-1 is formed for the pixel having a pixel electrode 16-1. A sensor S1 thereof has a short electrode-to-electrode gap length Z1 between a pixel electrode 16-1 and the opposed contact electrode 13.

Further, a slightly low sensor column 20-2 is formed for the pixel having a pixel electrode 16-2. A sensor S2 thereof has an electrode-to-electrode gap length Z2 between a pixel electrode 16-2 and the opposed contact electrode 13. The electrode-to-electrode gap length Z2 is longer than the electrode-to-electrode gap length Z1.

Still further, an even lower sensor column 20-3 is formed for the pixel having a pixel electrode 16-3. A sensor S3 thereof has an electrode-to-electrode gap length Z3 between a pixel electrode 16-3 and the opposed contact electrode 13. The electrode-to-electrode gap length Z3 is longer than the electrode-to-electrode gap length Z2.

That is, in the case of the structure shown in FIG. 6, the sensor columns 20-1, 20-2 and 20-3 with different heights are formed one for each of the pixels. This forms the sensors S1, S2 and S3 of the pixels with different electrode-to-electrode gap lengths.

As described above, the difference in electrode-to-electrode gap length between the different sensors S allows for determination of the pressing pressure.

When the sensor is pressed from the side of the color-filter-side glass substrate 10, the same substrate 10 bends as illustrated in FIG. 5. The extent to which the same substrate 10 bends varies depending on the pressing pressure. As a result, which of the sensors S1, S2 and S3 will be turned ON by the pressing pressure varies depending on the pressing pressure.

For example, when a small pressing pressure is applied, only the sensor S1 turns ON. A larger pressing pressure turns ON the sensors S1 and S2. An even larger pressing pressure turns ON the sensors S1, S2 and S3.

Therefore, if the read circuit 2 knows in advance which structure, i.e., that of the sensor S1, S2 or S3, each of the sensor S has, the same circuit 2 can determine the approximate pressing pressure applied by determining which pixels are ON.

Normally, when the surface of the liquid crystal display panel 1 is pressed, for example, with a finger, there are many pixels in the area corresponding to the pressed position. Therefore, if the electrode-to-electrode gap length is the same for all the pixels as in the case of existing display devices, the sensors S of the many pixels in the pressed position are detected to be ON. As a result, the pressed position of the screen can be detected, but the amount of pressing pressure cannot be determined.

However, if each of the many pixels in the area corresponding to the pressed position has one of the three sensors S1, S2 and S3 having different electrode-to-electrode gap lengths, the pressed position of the panel can be detected at least when the sensor of the pixel having the sensor S1 is detected to be ON. In addition, if the sensors of only the pixels having the sensors S1 are ON in the area corresponding to the pressed position, it is possible to determine that a relatively small pressing pressure has been applied. Further, if the sensors of the pixels having the sensors S1 and S2 are ON, it is possible to determine that a slightly larger pressing pressure has been applied. Still further, if the sensors of the pixels having the sensors S1, S2 and S3 are ON in the area corresponding to the pressed position, it is possible to determine that an even larger pressing pressure has been applied.

As described above, if the sensors S1, S2 and S3 respectively having the different electrode-to-electrode gap lengths Z1, Z2 and Z3 are distributed one to each of the pixels, it is possible to determine the pressing pressure.

Here, the pressing pressure can be determined in three levels of gradation for reasons of simplicity in description. Naturally, however, if the sensors S1 to Sn respectively having the n different electrode-to-electrode gap lengths Z1 to Zn are distributed among the pixels, it is possible to determine the pressing pressure in n levels of gradation.

FIGS. 7 to 12 illustrate examples of structures to provide different electrode-to-electrode gap lengths.

Figure 7:
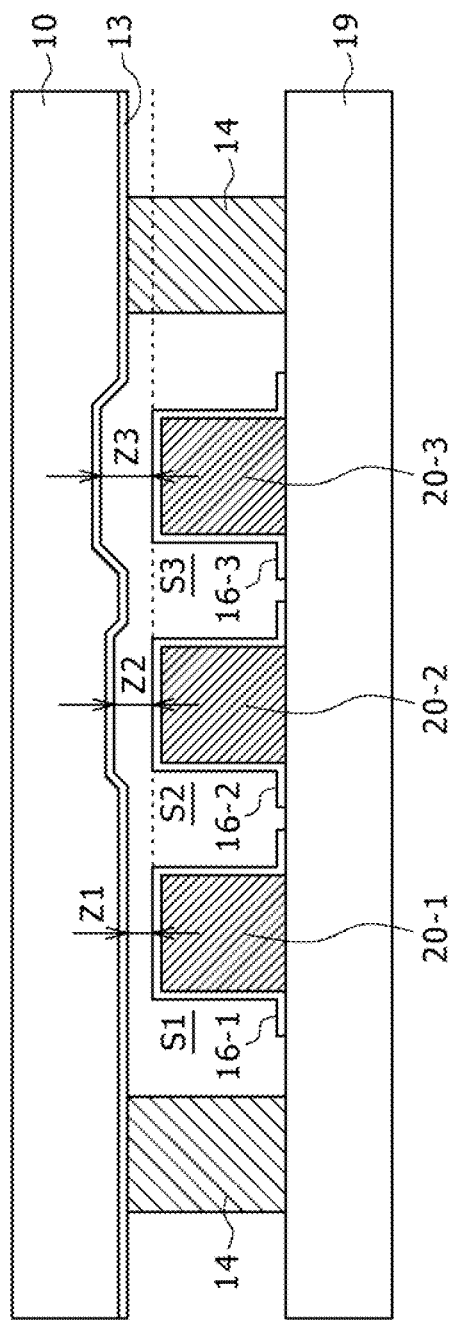
FIG. 7 is an explanatory diagram of another example of sensor structure with different electrode-to-electrode gap lengths according to the embodiment.

In FIG. 7, the sensor columns 20-1, 20-2 and 20-3 respectively for the sensors S1, S2 and S3 are the same in height as each other. In this case, depressed portions are formed on the color-filter-side glass substrate 10. The portions of the opposed contact electrode 13 opposed to the pixel electrodes 16-2 and 16-3 are formed into depressed shapes of different depths. This forms the different electrode-to-electrode gap lengths Z1, Z2 and Z3.

Figure 8:
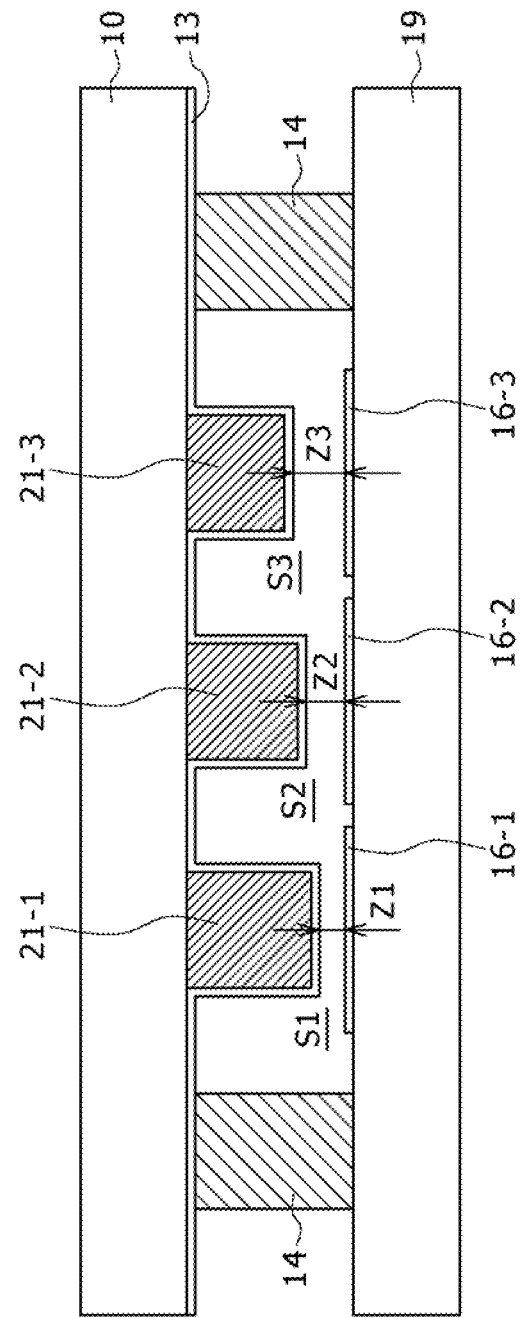
FIG. 8 is an explanatory diagram of still another example of sensor structure with different electrode-to-electrode gap lengths according to the embodiment.

In the structure shown in FIG. 8, the pixel electrodes 16-1, 16-2 and 16-3 are disposed two-dimensionally on the TFT-side glass substrate 19.

The sensor columns 21-1, 21-2 and 21-3 with different heights are formed on the color-filter-side glass substrate 10. The opposed contact electrode 13 is continuous on the sensor columns 21-1, 21-2 and 21-3. This forms the sensors S1, S2 and S3 with the different electrode-to-electrode gap lengths Z1, Z2 and Z3.

Figure 9:
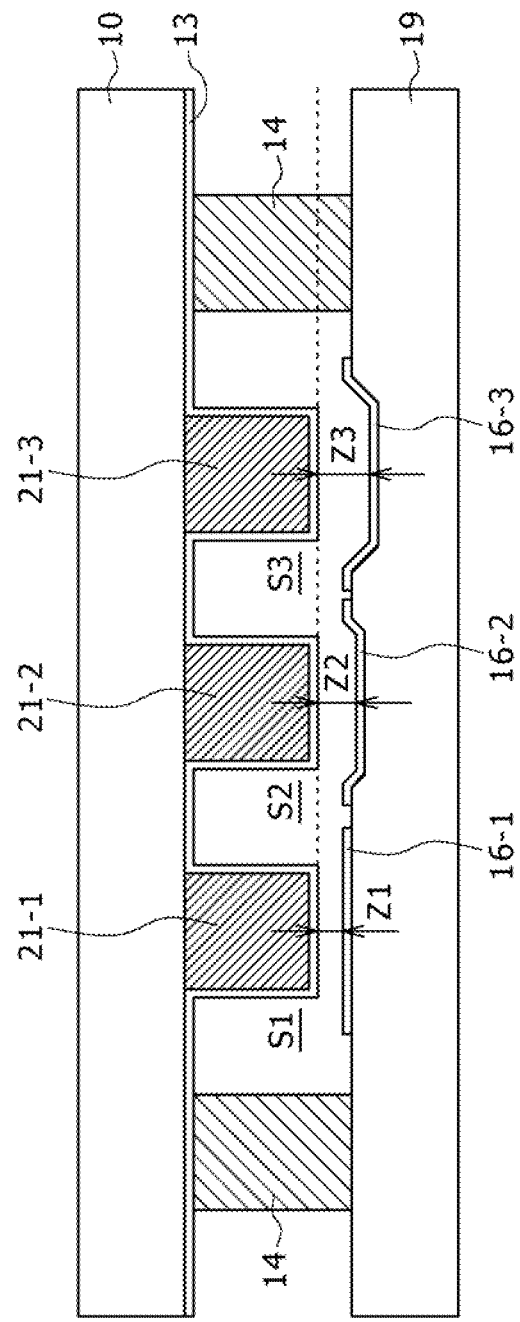
FIG. 9 is an explanatory diagram of still another example of sensor structure with different electrode-to-electrode gap lengths according to the embodiment.

In the structure shown in FIG. 9, the sensor columns 21-1, 21-2 and 21-3 with the same height are formed on the color-filter-side glass substrate 10. The opposed contact electrode 13 is continuous on the sensor columns 21-1, 21-2 and 21-3. On the other hand, depressed portions of different depths are formed on the TFT-side glass substrate 19. The pixel electrode 16-1 is formed on a flat portion. The pixel electrode 16-2 is formed within and along a shallow depressed portion. The pixel electrode 16-3 is formed within and along a deep depressed portion. This forms the sensors S1, S2 and S3 with the different electrode-to-electrode gap lengths Z1, Z2 and Z3.

In the case of this structure, the formation of the depressed portion structure can be incorporated in the photo process for the TFT array side. This makes the present structure advantageous in that it can form the sensors S1, S2 and S3 with the different electrode-to-electrode gap lengths Z1, Z2 and Z3 without adding any process steps.

Figure 10:
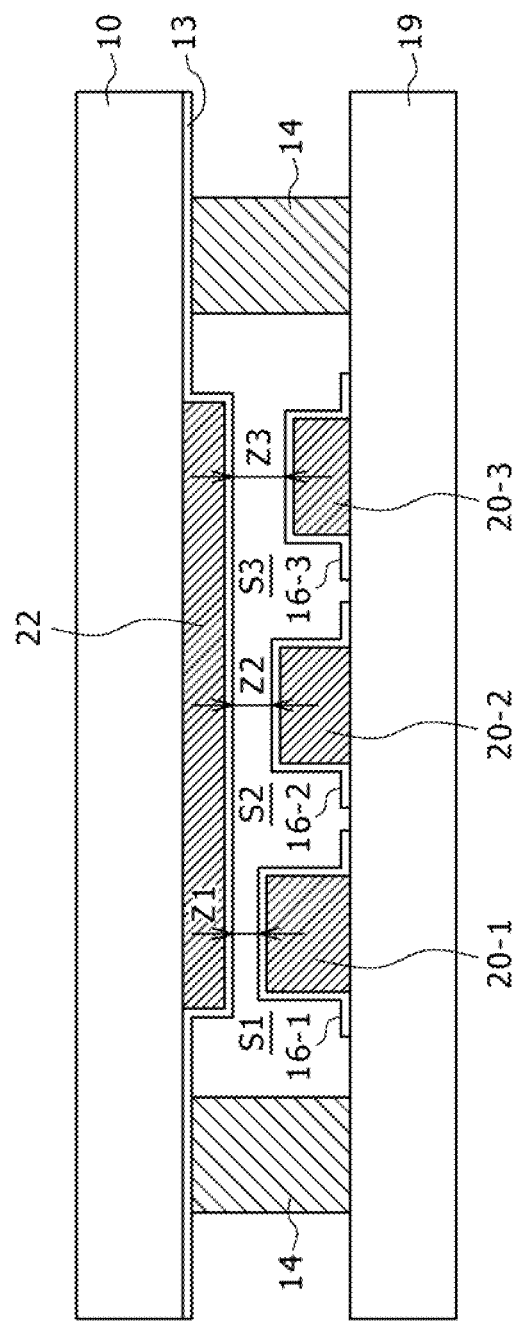
FIG. 10 is an explanatory diagram of still another example of sensor structure with different electrode-to-electrode gap lengths according to the embodiment.

In the structure shown in FIG. 10, the sensor columns 20-1, 20-2 and 20-3 with different heights are formed on the TFT-side glass substrate 19. On the other hand, a structure 22 in a uniform projecting shape is formed over an area of the color-filter-side glass substrate 10 opposed to the pixel electrodes 16-1, 16-2 and 16-3 respectively on the sensor columns 20-1, 20-2 and 20-3. The opposed contact electrode 13 is continuous on the structure 22. This forms the sensors S1, S2 and S3 with the different electrode-to-electrode gap lengths Z1, Z2 and Z3.

This structure is advantageous in that the electrodes are automatically exposed because PI is rejected on the structure 22.

Figure 11:
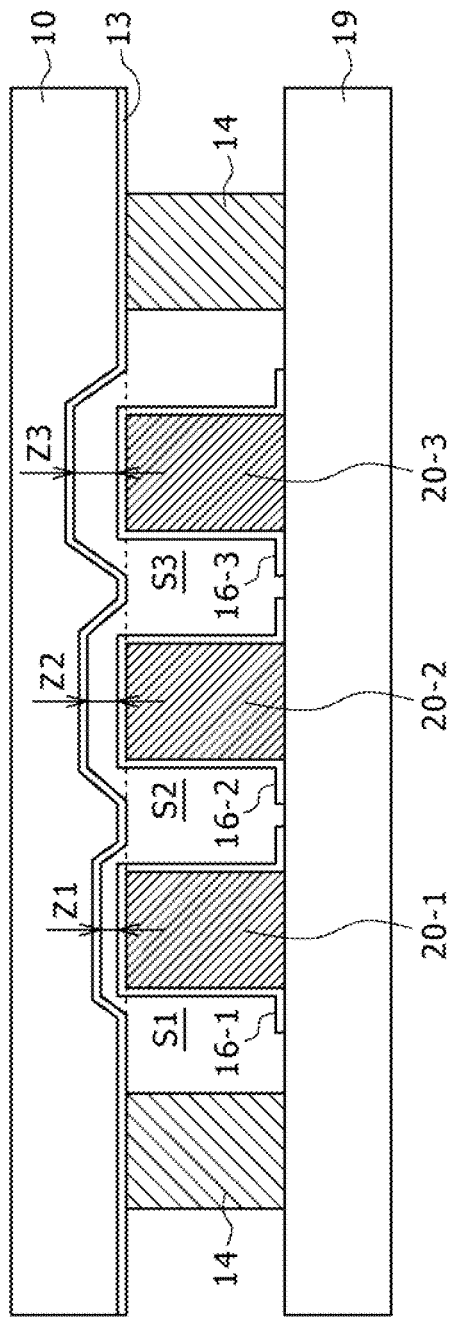
FIG. 11 is an explanatory diagram of still another example of sensor structure with different electrode-to-electrode gap lengths according to the embodiment.

In the structure shown in FIG. 11, the sensor columns 20-1, 20-2 and 20-3 with the same height as the spacers 14 are provided on the TFT-side glass substrate 19. Depressed portions are formed on the color-filter-side glass substrate 10. The portions of the opposed contact electrode 13 opposed to the pixel electrodes 16-1, 16-2 and 16-3 are formed into depressed shapes of different depths. This forms the different electrode-to-electrode gap lengths Z1, Z2 and Z3.

This structure is advantageous in that the spacers 14 and sensor columns 20-1, 20-2 and 20-3 can be formed together in a single process step.

Figure 12:
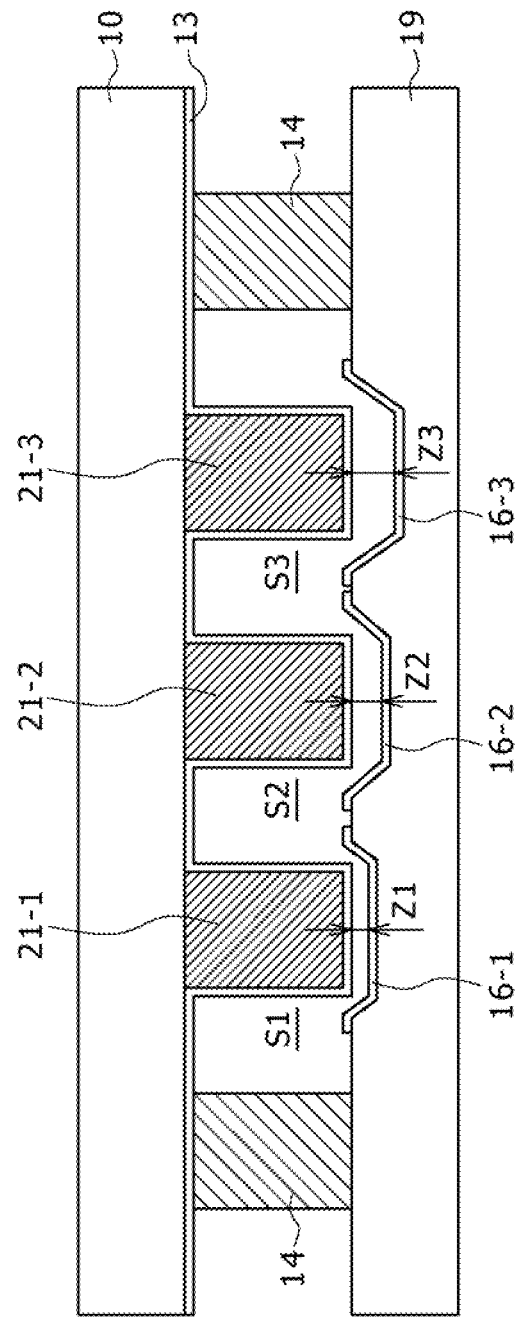
FIG. 12 is an explanatory diagram of still another example of sensor structure with different electrode-to-electrode gap lengths according to the embodiment.

In the structure shown in FIG. 12, the sensor columns 20-1, 20-2 and 20-3 with the same height as the spacers 14 are provided on the color-filter-side glass substrate 10. Depressed portions are formed on the TFT-side glass substrate 19. The pixel electrodes 16-1, 16-2 and 16-3 are formed within and along depressed portions of different depths. This forms the different electrode-to-electrode gap lengths Z1, Z2 and Z3.

This structure is advantageous in that the spacers 14 and sensor columns 20-1, 20-2 and 20-3 can be formed together in a single process step.

Although examples of structures of the sensors S1, S2 and S3 with the different electrode-to-electrode gap lengths Z1, Z2 and Z3 have been described above, it is a matter of course that there are other possible examples of structures.

Further, it is needless to say that the structural examples shown in FIGS. 6 to 12 are applicable when four or more different electrode-to-electrode gap lengths are formed.

4. Examples of Setting Electrode-to-Electrode Gap Lengths

The present embodiment allows for determination of not only the touched position but also the level of gradation of the pressing pressure by distributing the sensors S with different electrode-to-electrode gap lengths one in each of the pixels as described in the above examples.

It should be noted that when the sensor S is provided in a pixel using the pixel electrode 16 and opposed contact electrode 13 (COM electrode) in the pixel circuit, the plurality of sensors S can be formed in a single pixel (single pixel circuit 5). However, it is not necessary to provide the plurality of sensors S with different electrode-to-electrode gap lengths in a single pixel. That is, even if the plurality of sensors S with different electrode-to-electrode gap lengths are provided in a single pixel, the potential detected by the read circuit 2 is always the potential of the electrodes which come into contact with each other first. Therefore, even if the electrodes of the next sensor S come into contact with each other, the potential remains unchanged. As a result, it is not possible to determine whether the electrodes of the sensor S for the next level have come into contact with each other.

Therefore, the sensors S with different electrode-to-electrode gap lengths are distributed, one in each of the pixels.

Incidentally, in order to determine the pressing pressure properly, the plurality of electrode-to-electrode gap lengths must be set based on the relationship between the pressing pressure applied to the color-filter-side glass substrate 10 and the deformation of the same substrate 10 by the pressing pressure. A description will be given below in this respect.

The relationship between the pressing pressure applied to the glass substrate (color-filter-side glass substrate) 10 and the change in the electrode-to-electrode distance (change in the electrode-to-electrode gap length Z) is determined uniquely by the glass thickness, spacer density (density of provision of the spacers 14) and physical properties of the material.

Further, when the glass thickness, spacer density and physical properties of the material are the same, the pressing pressure and the change in the electrode-to-electrode distance are proportional to each other.

As in the above example, the sensor S with the smallest electrode-to-electrode gap length of all the sensors S is referred to as a sensor S1. The sensor S with the second smallest electrode-to-electrode gap length is sequentially referred to as a sensor S2. Similarly, the sensor S with the nth smallest electrode-to-electrode gap length is referred to as a sensor Sn. On the other hand, the electrode-to-electrode gap lengths thereof are respectively denoted by Z1, Z2, Z3 . . . up to Zn. The pressing pressures demanded for respective pairs of the electrodes to come into contact with each other are denoted by F1, F2, F3 . . . up to Fn. Then, the relationship between the electrode-to-electrode gap length Z1 and pressing pressure F1 can be expressed by the following equation:

$$Z1 = k1 \times F1 \qquad \text{(Equation 1)}$$

where k is a constant determined by the above factors.

Further, the pressure demanded for the electrodes of the sensor S2 to come into contact with each other after the electrodes of the sensor S1 have come into contact with each other is not $Z2 = k1 \times F2$. The reason for this is that because the sensor S1 begins to function as a spacer from the moment when the electrodes of the sensor S1 come into contact with each other, the spacer density changes, causing the constant k to become smaller.

The relationship between F and Z from when the electrodes of the sensor S1 come into contact with each other to when those of the sensor S2 come into contact with each other is as follows:

$$Z2-Z1 = k2 \times (F2-F1) \quad \text{(Equation 2)}$$

where $k1 > k2$.

Here, we solve Equation 2 with respect to Z2. Because $k1 > k2$ and from Equations 1 and 2, Z2 can be expressed as follows:

$$Z2/F1 > (Z2-Z1)/(F2-F1)$$

$$Z1 \times (F2-F1)/F1 + Z1 > Z2 \quad \text{(Equation 3)}$$

The relationship between k1 and k2 varies depending on the settings of the spacer density and sensor S1 density.

Further, the relationship between the n−1th sensor and nth sensor can be similarly expressed as follows:

Because $(k(n-1) > kn)$, $$(Z(n-1)-Z(n-2))/F(n-1) > (Zn-Z(n-1))/(Fn-F(n-1))$$

$$(Z(n-1)-Z(n-2)) \times (Fn-F(n-1))/F(n-1) + Z(n-1) > Zn \quad \text{(Equation 4)}$$

Figure 13B:
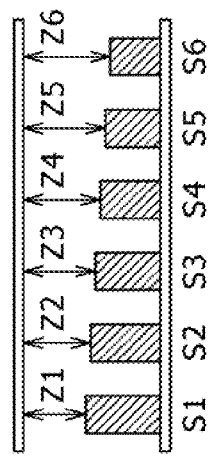
FIGS. 13A and 13B are explanatory diagrams of examples of setting electrode-to-electrode gap lengths according to the embodiment.
Figure 13A:
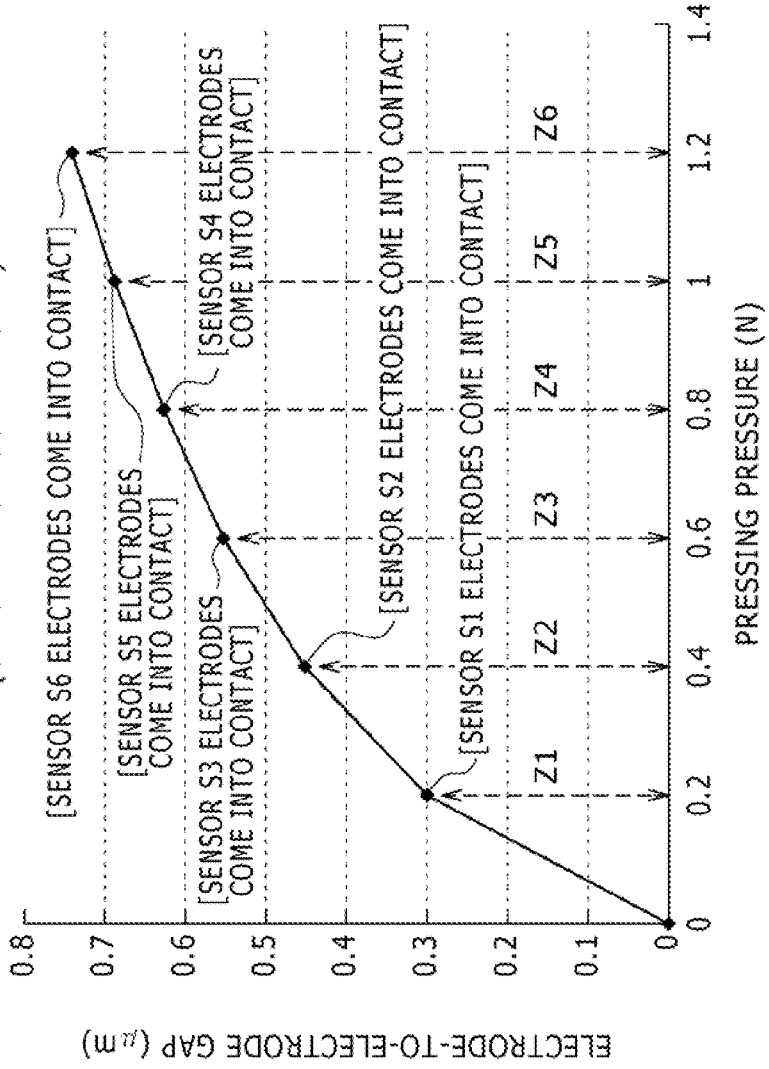

FIG. 13A illustrates an example of the relationship between the pressing pressure and the change in the electrode-to-electrode gap length when the sensors S1 to S6 respectively have the electrode-to-electrode gap lengths Z1 to Z6 as illustrated in FIG. 13B.

Until the electrodes of the sensor S1 come into contact with each other, the pressing pressure and the change in the electrode-to-electrode gap length show a linear relationship because the spacer density, glass thickness and physical properties of the material remain unchanged.

When the electrodes of the sensor S1 come into contact with each other (when the sensor S1 turns ON), the sensor S1 begins to function as a spacer, thus leading to a higher spacer density. Similarly, each time the electrodes of the sensor S2, S3 and so on come into contact with each other, the spacer density will increase, causing the deformation rate to become smaller.

Here, in order for the next sensors to turn ON each time a pressing pressure of 0.2 N is added, the electrode-to-electrode gap lengths Z1 to Z6 of the sensors S1 to S6 need only be set respectively to the distances Z1 to Z6 shown by dashed lines in FIG. 13A.

This makes it possible to determine the pressing pressure not only as simply being large or small but also quantitatively. For example, if the sensors S1 to S3 are ON, it is possible to determine that a pressing pressure of 0.8 N has been applied.

Of course, the above is merely an example. A variety of types of sensors can be used as the sensors S1 to Sn.

Further, the electrode-to-electrode gap lengths Z need not necessarily be set in such a manner as to ensure that the pressing pressures are equidistantly spaced apart (e.g., every 0.2 N).

Still further, if it is only necessary to determine the levels of gradation of pressing pressure with no need to determine the amount of pressing pressure itself, the gap lengths Z1 to Zn need not be set to the distances appropriate to the deformations of the glass substrate.

5. Examples of Arrangement of the Sensors

A description will be given next of examples of arrangement of the sensors S1 to Sn.

FIG. 14A illustrates examples of arrangement of the sensors S1 to S6 when these sensors are disposed as shown in FIG. 14H. This figure illustrates an example of stripe type pixel arrangement having the sensors S1 to S6. The sensors having the same electrode-to-electrode gap lengths are arranged with regularity as shown in the figure. In FIGS. 14B to 14G, the sensors whose electrodes come into contact with each other due to the difference in pressing pressure are shown shaded.

FIGS. 15A and 15B and FIGS. 16A and 16B illustrate examples of cross-sectional structures of the sensors shown respectively in FIGS. 14B to 14E with their electrodes into contact with each other.

FIG. 15A illustrates the condition in which only the sensor S1 is turned ON by a small pressure.

FIG. 15B illustrates the condition in which the sensors S1 and S2 are turned ON by a larger pressure.

FIG. 16A illustrates the condition in which the sensors S1, S2 and S3 are turned ON by an even larger pressure.

FIG. 16B illustrates the condition in which the sensors S1, S2, S3 and S4 are turned ON by an even larger pressure.

As described above, the sensors turn ON in order from the smallest to largest electrode-to-electrode gap length as a pressure is applied. Arrangement of the sensors with regularity as illustrated in FIG. 14A allows for proper determination of the amount of pressing pressure. That is, the change in spacer density as a result of the sensors serving as spacers after having turned ON can be quantitatively understood. This ensures accuracy in the determination of the amount of pressing pressure and facilitates the setting of the electrode-to-electrode gap lengths as described with reference to FIGS. 13A and 13B.

FIG. 17A illustrates another example of arrangement of the sensors. This figure illustrates an example of delta type pixel arrangement having the sensors S1 to S4. Similarly in this case, it is preferred that the sensors having the same electrode-to-electrode gap lengths be arranged with regularity.

In FIGS. 17B to 17E, the sensors which turn ON due to the difference in pressing pressure are shown shaded.

6. Effects of the Embodiment and Modification Example

As described above, the present embodiment permits entry of levels of gradation adapted to distinguish between different pressing pressures by using the structure which has hitherto been only capable of distinguishing between two different states or presence or absence of contact.

Such entry of levels of gradation resulting from the intensity of the pressure applied makes it possible to provide, for example, an application program which reads the change in writing pressure and draws brush-drawn-looking characters and images, despite the fact that they are pen-drawn. It is also possible to provide an application program which permits entry of different values according to the intensity of the pressure applied, for example, by a finger.

Further, for example, alarming function can be incorporated in a contact type touch panel to protect the panel and sensor structure against excessive pressing by measuring the amount of pressing pressure. This ensures use of a contact type touch panel with a proper pressing pressure.

Still further, for example, the orientation of liquid crystal may be disturbed if the panel is pressed with a large pressure. Only when the panel is pressed with a large pressure, the pixels pressed with such a pressure are identified so that the pixel potentials in a given range are adjusted, thus allowing for correction of the disturbed orientation.

It should be noted that a case has been described in the present embodiment in which the sensor S with the pixel and COM electrodes is provided in each liquid crystal pixel. However, an embodiment is also applicable to a sensor matrix array which is an array of sensors arranged in a planar direction and separately from the liquid crystal pixels.

Still further, the display device (display panel) according to an embodiment is not limited to that incorporated in a video recording device, but applicable to a variety of information processing devices and home electronic appliances such as video reproduction device, audio reproduction device, audio recording device, mobile phone, personal computer and PDA (personal digital assistance).

Still further, an embodiment is applicable, for example, to an organic EL (electroluminescence) touch panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display panel comprising:
a first substrate section formed on the front side of the display panel;
a second substrate section which is opposed to the first substrate section;
a liquid crystal;
a plurality of pixel sections formed in a matrix form between the first and second substrate sections, each pixel section including a plurality of pixels;
a plurality of sensor sections provided between the first substrate section and the second substrate section, each of the plurality of pixels including a sensor section and each of the sensor sections having a first electrode and a second electrode configured so that an electrode-to-electrode gap between the first electrode and the second electrode is removed to bring the first electrode into contact with the second electrode as a result of a deformation of the first substrate section under pressure, the plurality of sensor sections including a first sensor section and a second sensor section, the first sensor section having a first electrode-to-electrode gap length, the second sensor section having a second electrode-to-electrode gap length, the first electrode-to-electrode gap length being different from the second electrode-to-electrode gap length and forming a smallest to largest electrode-to-electrode gap length; and
a circuit for detecting the contact between the first electrode and the second electrode for each of the sensor sections such that the sensor sections turn on from the smallest to largest electrode-to-electrode gap length as a pressure is applied, so as to detect an amount of the pressure in multiple levels,
wherein the first electrode is provided between the first substrate section and the liquid crystal and the second electrode is provided between the second substrate section and the liquid crystal,
the plurality of sensor sections form projecting portions of different heights on the first substrate, and
the first electrode is arranged on one of the projecting portions so as to form a plurality of different electrode-to-electrode gap lengths between the first electrode and the second electrode.

2. The display panel of claim 1, wherein
the pixel sections are liquid crystal pixel sections.

3. The display panel of claim 2, wherein
the sensor sections are each formed for one of the liquid crystal pixel sections, and
a pixel electrode and common electrode adapted to drive the liquid crystal pixel section are used as the first electrode and the second electrode.

4. The display panel of claim 1, wherein
the first electrode of the sensor section is formed on the first substrate, and the second electrode thereof is formed on the second substrate.

5. The display panel of claim 1, wherein the plurality of sensor sections having different electrode-to-electrode gap lengths between the first electrode and the second electrode are arranged with predetermined regularity between the first and second substrates.

6. The display panel of claim 1, wherein the plurality of sensor sections form projecting portions of different heights on the second substrate, and
the second electrode is arranged on one of the projecting portions so as to form the plurality of different electrode-to-electrode gap lengths between the first electrode and the second electrode.

7. The display panel of claim 1, wherein the plurality of different electrode-to-electrode gap lengths between the first electrode and the second electrode are each set based on the relationship between a pressure applied to the first substrate section and deformation of the first substrate section.

8. A display device comprising:
a first substrate section formed on the front side of the display panel;
a second substrate section which is opposed to the first substrate section;
a plurality of pixel sections formed in a matrix form between the first and second substrate sections, each pixel section including a plurality of pixels;
a liquid crystal;
a plurality of sensor sections provided between the first substrate section and the second substrate section, each of the plurality of pixels including a sensor section and each of the sensor sections having a first electrode and a second electrode configured so that an electrode-to-electrode gap between the first electrode and the second electrode is removed to bring the first electrode into contact with the second electrode as a result of a deformation of the first substrate section under pressure, the plurality of sensor sections including a first sensor section and a second sensor section, the first sensor section having a first electrode-to-electrode gap length, the second sensor section having a second electrode-to-electrode gap length, the first electrode-to-electrode gap length being different from the second electrode-to-electrode gap length and forming a smallest to largest electrode-to-electrode gap length;
a display drive section configured to drive the plurality of pixel sections to display an image;
a sensor read section configured to determine the position of the first substrate section to which a pressure is applied and the amount of pressure applied thereto by detecting each electrode contact condition at a plurality of sensor sections; and
a circuit for detecting the contact between the first electrode and the second electrode for each of the sensor sections such that the sensor sections turn on from the smallest to largest electrode-to-electrode gap length as a pressure is applied, so as to detect an amount of the pressure in multiple levels,
wherein the first electrode is provided between the first substrate section and the liquid crystal and the second electrode is provided between the second substrate section and the liquid crystal, the plurality of sensor sections form projecting portions of different heights on the first substrate, and the first electrode is arranged on one of the projecting portions so as to form a plurality of different electrode-to-electrode gap lengths between the first electrode and the second electrode.

9. A display device comprising:

first substrate means formed on the front side of the display panel;

second substrate means which is opposed to the first substrate means;

a liquid crystal;

a plurality of pixel means formed in a matrix form between the first and second substrate means, each pixel means including a plurality of pixels;

a plurality of sensor means provided between the first substrate means and the second substrate means, each of the plurality of pixels including a sensor means and each of the sensor means having a first electrode and a second electrode configured so that an electrode-to-electrode gap between the first electrode and the second electrode is removed to bring the first electrode into contact with the second electrode as a result of a deformation of the first substrate means under pressure, the plurality of sensor means including a first sensor means and a second sensor means, the first sensor means having a first electrode-to-electrode gap length, the second sensor means having a second electrode-to-electrode gap length, the first electrode-to-electrode gap length being different from the second electrode-to-electrode gap length and forming a smallest to largest electrode-to-electrode gap length;

display drive means for driving the plurality of pixel means to display an image; and sensor read means for determining the position of the first substrate means to which a pressure is applied and the amount of pressure applied thereto by detecting each electrode contact condition at a plurality of sensor conditions; and a circuit for detecting the contact between the first electrode and the second electrode for each of the sensor means such that the sensor means turn on from the smallest to largest electrode-to-electrode gap length as a pressure is applied, so as to detect an amount of the pressure in multiple levels, wherein the first electrode is provided between the first substrate means and the liquid crystal and the second electrode is provided between the second substrate means and the liquid crystal, the plurality of sensor means form projecting portions of different heights on the second substrate, and the second electrode is arranged on one of the projecting portions so as to form a plurality of different electrode-to-electrode gap lengths between the first electrode and the second electrode.

* * * * *

UNITED STATES PATENT AND TRADEMARK OFFICE
CERTIFICATE OF CORRECTION

| | | |
|---|---|---|
| PATENT NO. | : 8,928,596 B2 | Page 1 of 1 |
| APPLICATION NO. | : 12/571634 | |
| DATED | : January 6, 2015 | |
| INVENTOR(S) | : Hayashi et al. | |

It is certified that error appears in the above-identified patent and that said Letters Patent is hereby corrected as shown below:

On the Title Page, item (75), in the Inventors section, please replace

"Hiroshi Muzuhashi" with

--Hiroshi Mizuhashi--

Signed and Sealed this
Thirtieth Day of June, 2015

Michelle K. Lee
*Director of the United States Patent and Trademark Office*